(12) United States Patent
Schäfer et al.

(10) Patent No.: US 8,276,355 B2
(45) Date of Patent: Oct. 2, 2012

(54) HARVESTING MACHINE WITH A TRANSPORT UNIT FOR THE INSTALLATION AND REMOVAL OF A CROP PROCESSING UNIT

(75) Inventors: Rainer Schäfer, Zweibrücken (DE); Manfred Engel, Großsteinhausen (DE); Christoph Spallek, Weilerbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/024,442

(22) Filed: Feb. 10, 2011

(65) Prior Publication Data

US 2012/0167536 A1 Jul. 5, 2012

(30) Foreign Application Priority Data

Mar. 10, 2010 (DE) .......................... 10 2010 002 730

(51) Int. Cl.
*A01D 61/00* (2006.01)
(52) U.S. Cl. ..................................................... 56/16.4 R
(58) Field of Classification Search ............... 56/16.4 R, 56/16.4 A, 16.4 B, 16.6, 153, DIG. 1, DIG. 9, 56/501, 212, 213, 208; 241/101.01, 101.02, 241/101.74; 212/310, 272, 273, 321, 322
See application file for complete search history.

(56) References Cited

U.S. PATENT DOCUMENTS

| | | | | |
|---|---|---|---|---|
| 3,530,650 A | * | 9/1970 | Phillips | 56/2 |
| 3,977,165 A | * | 8/1976 | Klinner et al. | 56/16.4 R |
| 4,280,430 A | * | 7/1981 | Wilson et al. | 114/51 |
| 4,696,432 A | * | 9/1987 | Russ et al. | 241/101.742 |
| 4,767,067 A | * | 8/1988 | Bruer et al. | 241/81 |
| 5,082,189 A | * | 1/1992 | Ernst et al. | 241/158 |
| 5,595,537 A | * | 1/1997 | Jungemann et al. | 460/100 |
| 5,863,005 A | * | 1/1999 | Bramstedt et al. | 241/101.742 |
| 6,425,232 B1 | * | 7/2002 | Desnijder et al. | 56/16.4 B |
| 6,539,693 B2 | * | 4/2003 | Krone et al. | 56/16.6 |
| 6,604,352 B1 | * | 8/2003 | Tyvaert et al. | 56/16.4 B |
| 6,988,352 B2 | * | 1/2006 | Van Vooren | 56/16.4 R |
| 2007/0191179 A1 | * | 8/2007 | Hugenroth et al. | 477/2 |

FOREIGN PATENT DOCUMENTS

| | | | |
|---|---|---|---|
| DE | 2508697 A | * | 9/1976 |
| DE | 3522376 A1 | * | 1/1987 |
| DE | 4215696 A1 | * | 11/1993 |

* cited by examiner

*Primary Examiner* — Arpad Fabian-Kovacs

(57) ABSTRACT

An agricultural harvesting machine is provided having a frame, a crop processing unit that is movable with respect to the frame between an operating position, in which it is inserted into a channel through which crop can flow, and a non-operating position outside the channel. A transport unit is provided with a first arm articulated to the frame of the harvesting machine pivotably about a first vertical axis, a winch and a traction device connected to the winch for lifting the crop processing unit out of its non-operating position and for moving the crop processing unit into a position outside the harvesting machine. The transport unit further is provided with a second arm holding the traction device and articulated to the outer end of the first arm pivotably about a second vertical axis.

5 Claims, 4 Drawing Sheets

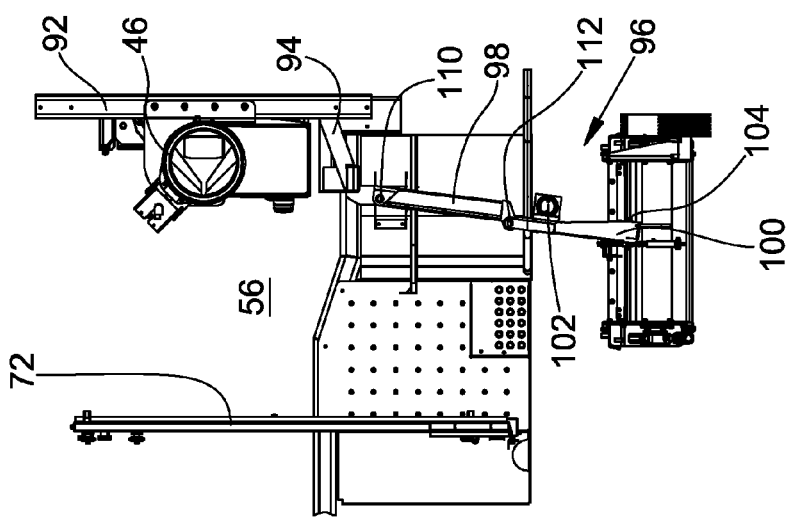
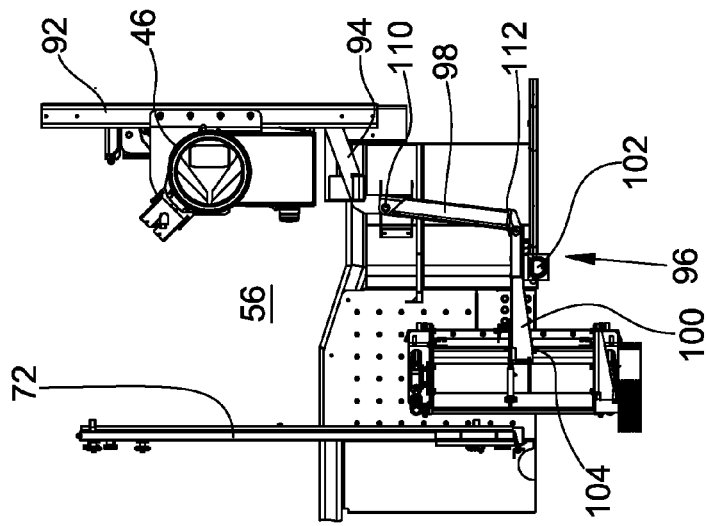
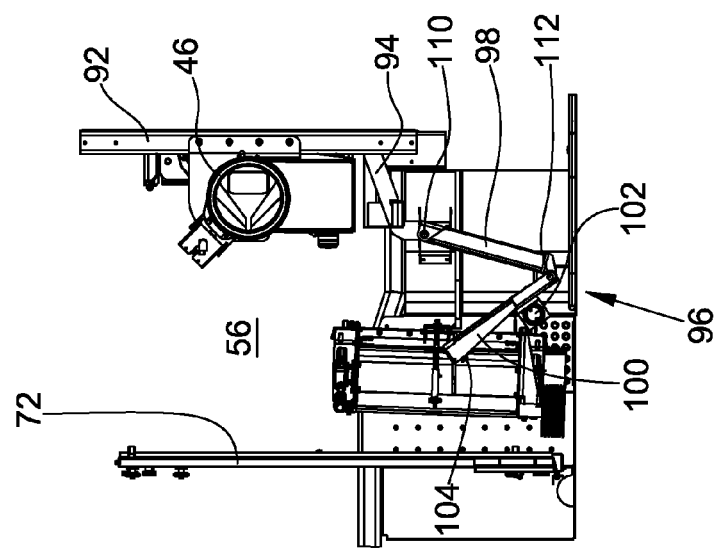

HARVESTING MACHINE WITH A TRANSPORT UNIT FOR THE INSTALLATION AND REMOVAL OF A CROP PROCESSING UNIT

FIELD OF THE INVENTION

The invention relates to an agricultural harvesting machine having a crop processing unit that is movable with respect to the frame between an operating position, in which it is inserted into a channel through which crop can flow, and a non-operating position outside the channel, and with a transport unit articulated to the frame of the harvesting machine that is pivotable about a first vertical axis, a winch and a traction means connected to the winch for lifting the crop processing unit out of its non-operating position and for moving the crop processing unit into a position outside the harvesting machine.

BACKGROUND OF THE INVENTION

Forage harvesters are used for harvesting whole plants or their parts, which are picked up from a field by means of a harvester head, pressed together by means of pressing rollers and led to a cutter drum, whose chopping cutters comminute the plants in cooperation with an opposing cutter. Then the comminuted plants or parts are optionally supplied to a conditioning unit and conveyed by an acceleration unit into an ejection chute that loads them onto a transport vehicle. The comminuted plants generally are used as animal feed or for generating biogas.

The conditioning unit generally comprises two or more rollers driven in opposite directions that are pre-stressed against one another by spring force and between which the chopped material is fed. It is required for corn harvesting to beat the kernels contained in the chopped material to improve the digestibility of the feed. Conditioning is not required for grass harvesting, on the other hand, for which reason the rollers of the conditioning unit are either brought into a position in which a sufficiently large gap remains between them, or the conditioning unit is moved out of the channel between the chopper drum and the accelerator and a hollow shell is inserted in its place. If the conditioning unit is not required for a long time, it is typically removed from the forage harvester and stored.

A harvesting machine of the type mentioned above is described in EP 1 869 966 A1. Behind the channel between the chopping drum and an accelerator in a forage harvester, an accessible service space is provided, into which the conditioning unit can be moved when not in use. An arm is articulated pivotably about a vertical axis to a frame connected to the chassis of the forage harvester. A winch seated movably along the arm is mounted on the arm. A traction means that can be wound up by the winch is used for lifting the conditioning unit. For removal, the arm with the winch is accordingly positioned above the conditioning unit that has been moved to the rear, the traction means is locked on the conditioning unit and the latter is lifted with the winch. While the conditioning unit is being moved out, the winch is moved a bit along the arm and the arm is pivoted by an angle about the vertical axis, in succession or at the same time, in order to prevent the conditioning unit from striking against the walls of the maintenance space. Finally, the conditioning unit is outside the maintenance space and can be lowered from there onto the ground or a vehicle. In another embodiment, the arm consists of two telescoping parts and the winch is mounted at the outer end of the outer part.

During the removal and installation of the conditioning unit of EP 1 869 966 A1, the winch must be moved manually by the operator relative to the arm (or the telescoping part of the arm relative to the part of the arm pivotably articulated about the vertical axis). The rather high mass of the conditioning unit, often more than 100 kg, causes tilting of the movable elements, which in turn makes the movement quite sluggish.

The problem underlying the invention, for a harvesting machine with a transport unit having a first arm articulated pivotably about a vertical axis to the frame of the harvesting machine, a winch and a traction means connected to the winch for lifting the crop processing unit out of its non-operating position and for moving the crop processing unit into a position outside the harvesting machine, is to improve the harvesting machine in such a manner that the movement of the crop processing unit out of the harvesting machine (and in the opposite direction) is facilitated.

SUMMARY OF THE INVENTION

An agricultural harvesting machine comprises a frame and a crop processing unit that is movable relative to the frame between an operating position, in which it is inserted into a channel through which crop can flow, and a non-operating position outside the channel. A transport unit is used to lift the crop processing unit out of its non-operating position and to move the crop processing unit into a position outside the harvesting machine, and also in the opposite direction. The transport unit comprises a first arm articulated pivotably about a first vertical axis to the frame of the harvesting machine, and a second arm articulated pivotably about a second vertical axis to the outer end of the first arm. A flexible traction means or device in the form of a cable or a chain for example, is supported on the second arm and can be drawn up or lowered by means of a winch actuated manually or by an electric motor.

The crop processing unit is moved vertically by means of the winch and the traction means, which can be detachably connected to the crop processing unit, e.g., by a hook. The traction means is drawn upward or lowered by the winch, so that the crop processing unit is likewise moved vertically. The traction means with the crop processing unit is moved horizontally by simultaneously or successively pivoting the two arms about the two axes. A translational movement of the winch relative to an arm or of the arms relative to one another is therefore unnecessary. In this manner, the friction and the forces to be exerted by the operator in the horizontal movement of the crop processing unit are reduced.

In a preferred embodiment of the invention, the traction means is deflected by a roller mounted at the outer end of the second arm and the winch is mounted on the second arm a distance away from the outer end. One advantage of this arrangement is that the winch need not be mounted underneath the arm, so that a larger vertical range of movement for the crop processing unit is available.

BRIEF DESCRIPTION OF THE DRAWINGS

The exemplary embodiments of the invention are described in detail below with reference to the accompanying drawings wherein:

FIG. 5 is a plan view of the maintenance space of the harvesting machine, with a crop processing unit brought partially out of the maintenance space by means of the transport unit;

FIG. 6 is a plan view of the maintenance space of the harvesting machine, with a crop processing unit brought completely out of the maintenance space by means of the transport unit, and, FIG. 7 is a plan view of the maintenance space of the harvesting machine, with a crop processing unit brought outside the contours of the harvesting machine by means of the transport unit.

DESCRIPTION OF THE PREFERRED EMBODIMENT

Figure 1:
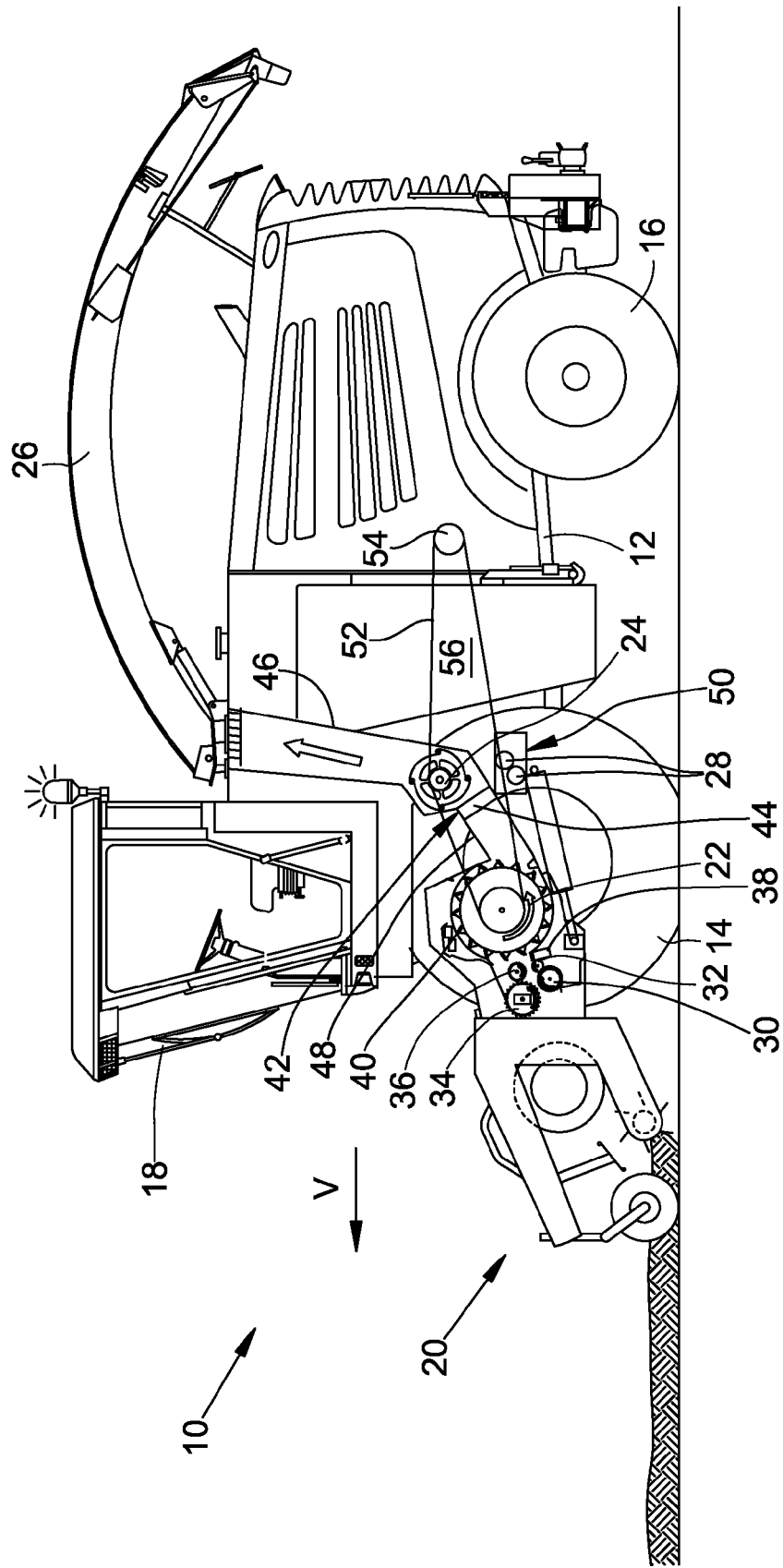
FIG. 1 is a self-propelled harvesting machine in a side view and a schematic representation.

A harvesting machine 10 in the form of a self-propelled forage harvester 10 shown in FIG. 1 is constructed on a frame 12 that is supported by front and rear wheels 14 and 16, respectively. The harvesting machine 10 is operated from a driver's cab 18, from which the crop gathering device 20 in the form of a pickup can be seen. Crop, e.g., grass, corn or the like, picked up from the ground by means of the crop gathering device 20 is fed in harvesting mode to a chopping drum 22 equipped with chopping cutters 40 that chop it into small pieces in cooperation with a shear bar 38 and transfer it to an accelerator 24. Between the crop gathering device 20 and the chopping drum 22, the crop is pre-compressed and transported by lower compression rollers 30, 32 and upper compression rollers 34, 36. The crop exits from the harvester 10 downstream of the accelerator 24 via a discharge shaft 46 and an ejection chute 26 rotatable about the vertical axis and height adjustable at the ejection end, to a truck or trailer traveling alongside. Directional indications such as front and back refer below to the forward direction of the harvesting machine 10, which runs to the left in FIG. 1.

In a channel 48, rising toward the rear, between the chopping drum 22 and the conveyor device 24, there is a section 40 in which, instead of a hollow shell 44 used for grass harvesting, a crop processing unit 50 in the form of a conditioning unit with two rollers 28 can be inserted selectively. The section 40 thus constitutes an interruption in the channel 48, into which the crop processing unit 50 or the shell 44 can alternatively be inserted. The crop processing unit 50 is particularly necessary for corn harvesting in order to beat the kernels contained in the chopped material for better animal digestibility. For corn harvesting, the crop gathering device 20 shown in FIG. 1 is replaced by a corn picker head. For grass harvesting, however, the shell 44 is inserted into the section 40 as shown in FIG. 1, since no further processing is required.

Figure 2:
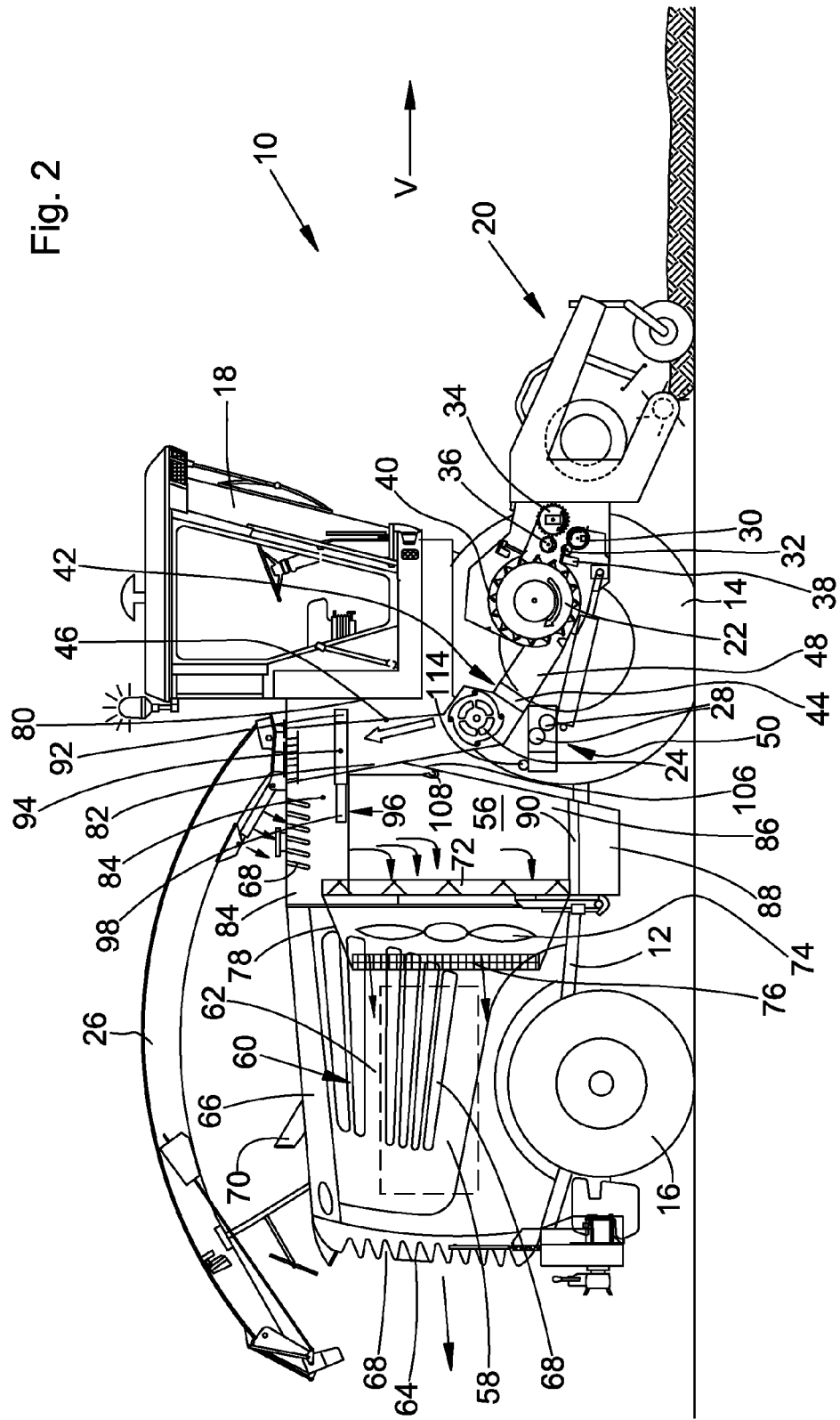
FIG. 2 is the harvesting machine of FIG. 1 from the other side.

The chopping drum 22 and the accelerator 24 are driven via a belt 52 driven by a belt sheave 54 which is in turn driven via a suitable gear mechanism by an internal combustion engine 58 arranged behind a maintenance space 56 (see FIG. 2).

FIG. 2 shows a view of the harvesting machine 10 similar to FIG. 1 but from the opposite side, on the right in the forward direction V. Energy for driving the harvesting attachment 20, the compression rollers 30-36, the crop processing unit 50 and the accelerator 24, as well as other driven elements and actuators of the harvesting machine 10 (via mechanical, hydraulic and/or electrical drive trains), is supplied from an internal combustion engine 58 that is arranged inside an engine compartment 60 above the rear wheels 16. The engine compartment 60 is bounded on both sides by side walls 62, at the back by a rear wall 64 and at the top by roof 66. The walls 62, 64 and the roof 66 generally have no supporting function, instead serving only to shield the internal combustion engine 58 from the outside, and are fixed to supporting struts (not shown) that are mounted on the frame 12. The walls 62, 64 and possibly, but not necessarily, the roof 66 as well are equipped with slot-like openings 68 through which air can escape. An exhaust pipe 70 of the internal combustion engine 58 passes through an opening in the roof 66.

The engine compartment 60 is bounded toward the front by a screen unit 72, which comprises a circular perforated filter element that can be set into rotation about its central axis running horizontally in the forward direction V by a drive unit. Behind the screen unit 72 there is a driven fan 74 with an axis of rotation running roughly coaxially with the central axis of the filter element. Various coolers 76, which can be, among others, an oil cooler for the internal combustion engine 58, an intercooler, a hydraulic oil cooler and an evaporator for an air-conditioning system for the drivers cab 18, are situated on the rear side of the fan 74. Toward the top and on the sides, the screen unit 72, the fan 74 and the coolers 76 are sealed off by a housing 78 in order to concentrate the air stream. After passing the coolers 76, the air stream flows around the internal combustion engine 58 and then reaches the outside through the openings 68. It would also be conceivable to equip the harvesting machine 10 with two or more internal combustion engines 58 and the associated coolers 76.

The accessible maintenance space 56, which is bounded toward the front by a wall 80 behind the rear wall of the driver's cab 18, the rear wall 82 of the stationary discharge shaft 46 and the housing of the accelerator 24, is formed on the front side of the screen unit 48. The maintenance space is bounded toward the top by a roof 84 equipped with air inlet slots 68. During operation, the fan 74 draws in ambient air through the air inlet slots 68. Finally, the interior space 56 is bounded on the sides by walls 84 into which a door 86 is inserted. A fuel tank 88, on the upper side of which a platform 90 is arranged that projects laterally from the maintenance space 56, is situated on the underside of the maintenance space 56.

A crossbeam 92 extending horizontally and transverse to the forward direction V, which also supports the shaft 46 and the rotary seat of the ejection chute 26 and is connected via additional beam elements (not shown) to the frame 12, is mounted on the frame 12 of the harvesting machine 10 in front of the shaft 46. The crossbeam 92 holds a longitudinal beam 94 that runs horizontally backward on the right side of the shaft 46. A transport unit 96 that is used for installing the crop processing unit 50 in the harvesting machine 10 and removing it therefrom is articulated to the rear end of the longitudinal beam 94. The transport unit 96 is comprised of a first arm 98, a second arm 100, a winch 102, a traction means 106 in the form of a cable with a hook 108, and a roller 104. The first arm 98 is seated on the beam 94 pivotably about a first axis 110 running vertically. The second arm 100 is seated at the outer end of the first arm 98 pivotably about a second axis 112 running vertically. The winch 102 is mounted on the second arm 100 in the direct vicinity of the second axis 112. It comprises a winding unit for the traction means 106 and a drive for the winding unit operated manually or by external force (in particular, with an electric motor). Starting from the winch 102, the traction means 106 is run over the roller 104 and extends downward from there to the hook 108. The crop processing unit 50 is equipped with an eye bolt 114 in which the hook 108 can be held.

Figure 3:
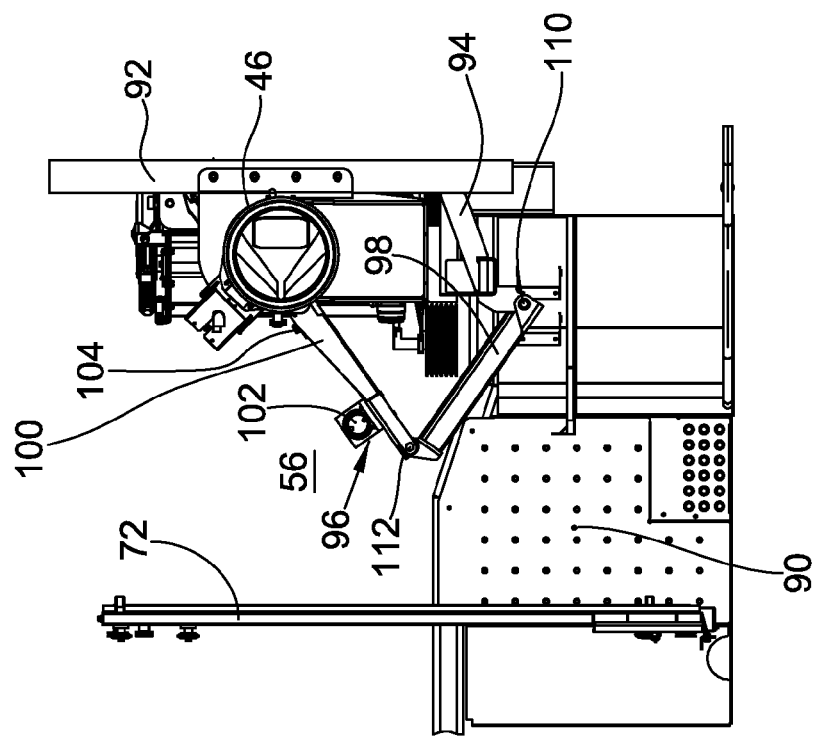
FIG. 3 is a plan view of the maintenance space of the harvesting machine, with a transport unit positioned above the crop processing unit in its non-operating position.

With this background, the removal of the crop processing unit 50 from the harvesting machine 10 takes place as follows. If the crop processing unit 50 is in the operating position in the section 40 of the channel 48, it is first brought into the non-operating position, as shown in FIGS. 1 and 2. A particularly suitable mechanism for this purpose is described in DE 10 2010 002 509 A1, the disclosure of which is hereby incorporated by reference into the present application. In the non-operating position, a belt that is driven by the shaft of the accelerator 24 and used to drive the rollers 28 of the crop processing unit 50 is sufficiently relaxed that it can easily be taken off. Subsequently, the arms 98, 100 of the transport unit 96 are brought into the position shown in FIG. 3, so that the roller 104 and the hook 108 are directly above the eye bolt 114. After a lock of the crop processing unit 50 has been released from its holder in the harvesting machine 10, the winch 102 is actuated in order to lower the traction means 106, and the hook 108 is anchored in the eye bolt 114. Then the winch 102 is activated to lift the crop processing unit 50 out of the non-operating position. It can then be brought into a position any desired height above the pedestal 90 and the bottom of the maintenance space 56.

Figure 4:
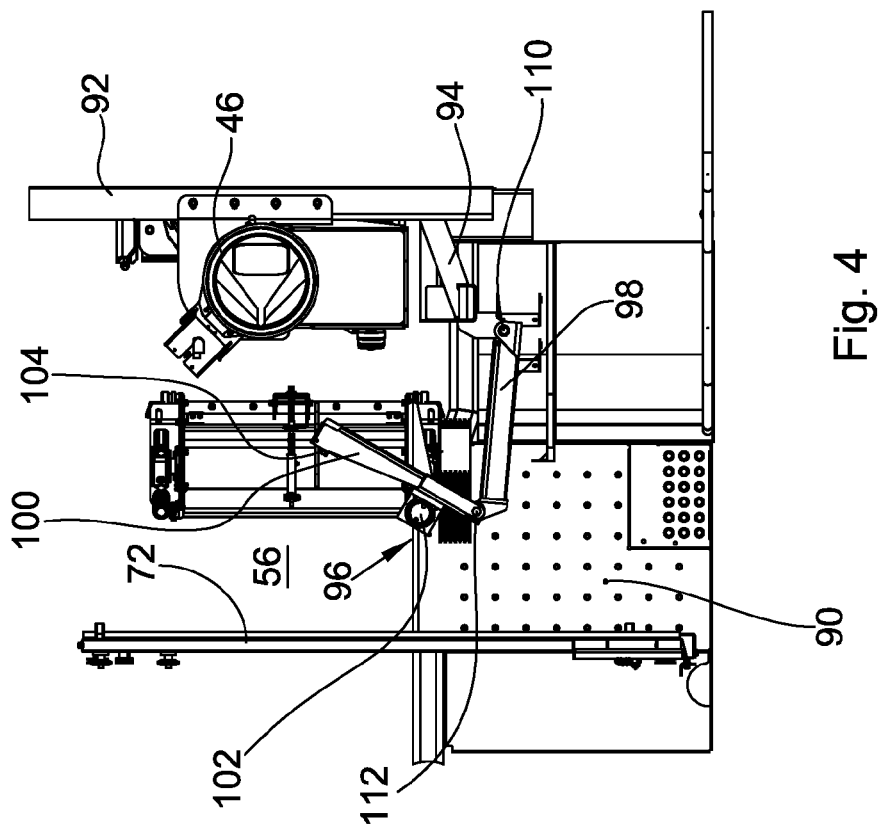
FIG. 4 is a plan view of the maintenance space of the harvesting machine, with a crop processing unit lifted by means of the transport unit and brought to the rear from the non-operating position.

In order to move the crop processing unit 50 out of the maintenance space 56, the arms 98, 100 are rotated counterclockwise about the axes 110, 112, so that the position according to FIG. 4 is achieved, in which the crop processing unit 50 is situated behind the shaft 46 in the center of the maintenance space 56. If the first arm 98 is then rotated further counterclockwise about the axis 110, the crop processing unit 50 moves partially out of the maintenance space 56 (FIG. 5), while the second arm 100 can be rotated clockwise about the axis 112 in order to avoid a collision of the crop processing unit 50 with the screen unit 72. When the first arm 98 runs approximately perpendicular to the forward direction V, the second arm 100 is rotated further clockwise about the axis 112 and outward in order to move the crop processing unit 50 completely out of the maintenance space 56 (FIG. 6) until it ultimately hangs laterally alongside the pedestal 90 outside the contours of the harvesting machine 10 (FIG. 7). There it can be lowered by means of the winch 102 and placed on the ground or another vehicle. An undesired rotation of the crop processing unit 50 can be prevented by operators holding it or by using a chain as the traction means 106. The reinstallation of the crop processing unit 50 takes place in the opposite order and direction.

The transport unit 96 can be permanently or removably mounted on the longitudinal beam 94, in order to be able to store it in the maintenance space 56 when not in use, or somewhere else in order to facilitate entry into the maintenance space 56. Various modifications are also possible. Thus the arms 98, 100 can be pivoted about the axes 110, 112 by externally operated actuators that are controlled by an operator or independently by a controller (not shown), in order to move the transport unit on predefined paths as shown in FIGS. 3-7. Particularly with such an embodiment, the dimensions of the maintenance space 56 can be reduced, because the presence of an operator there is not absolutely necessary. In case of a manual movement of the arms 98, 100 about the axes 110, 112, the operator can also be outside the maintenance space 56 if he moves the arms 98, 100 by suitable remote operating means (rods, for example) from a position outside the maintenance space 56.

Having described the preferred embodiment, it will become apparent that various modifications can be made without departing from the scope of the invention as defined in the accompanying claims.

The invention claimed is:

1. An agricultural harvesting machine having a frame, a crop processing unit that is movable with respect to the frame between an operating position, in which it is inserted into a channel through which crop can flow, and a non-operating position outside the channel, and having a transport unit with a first arm articulated to the frame of the harvesting machine pivotably about a first vertical axis, a winch and a traction means connected to the winch for lifting the crop processing unit out of its non-operating position and for moving the crop processing unit into a position outside the harvesting machine, wherein the transport unit comprises a second arm holding the traction means and articulated to the outer end of the first arm pivotably about a second vertical axis.

2. An agricultural harvesting machine according to claim 1, wherein the crop processing unit is located behind the channel when in its non-operating position.

3. An agricultural harvesting machine according to claim 1, wherein the crop processing unit is located in an accessible maintenance space when in its non-operating position.

4. An agricultural harvesting machine according to claim 1, wherein the traction means is deflected by a roller mounted at the outer end of the second arm and the winch is mounted on the second arm a distance away from the outer end of the second arm.

5. An agricultural harvesting machine according to claim 1, wherein the arms are dimensioned in such a manner that the crop processing unit can be set down on the ground laterally alongside the harvesting machine.

* * * * *